United States Patent
Elmose et al.

(10) Patent No.: US 10,684,192 B2
(45) Date of Patent: Jun. 16, 2020

(54) BEARING TEST RIG

(71) Applicant: Siemens Gamesa Renewable Energy A/S, Brande (DK)

(72) Inventors: Soeren Forbech Elmose, Bording (DK); Shravan Subramanyam Janakiraman, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 192 days.

(21) Appl. No.: 15/666,779

(22) Filed: Aug. 2, 2017

(65) Prior Publication Data

US 2018/0045607 A1 Feb. 15, 2018

(30) Foreign Application Priority Data

Aug. 10, 2016 (EP) .................................... 16183607

(51) Int. Cl.
*G01M 13/04* (2019.01)
*F16C 19/06* (2006.01)
*F16C 19/36* (2006.01)

(52) U.S. Cl.
CPC ............. *G01M 13/04* (2013.01); *F16C 19/06* (2013.01); *F16C 19/364* (2013.01)

(58) Field of Classification Search
None
See application file for complete search history.

(56) References Cited

U.S. PATENT DOCUMENTS

| 3,100,989 A * | 8/1963 | Jones | G01B 7/144 73/862.381 |
| 2005/0041898 A1* | 2/2005 | Yamada | F16C 19/52 384/490 |

(Continued)

FOREIGN PATENT DOCUMENTS

| CN | 1973143 A | 5/2007 |
| CN | 105378311 A | 3/2016 |

(Continued)

OTHER PUBLICATIONS

Extended European Search Report for European Application No. 1618360.7, dated Feb. 16, 2017.

(Continued)

*Primary Examiner* — Paul M. West
*Assistant Examiner* — Mark A Shabman
(74) *Attorney, Agent, or Firm* — Schmeiser, Olsen & Watts LLP

(57) ABSTRACT

A test rig to test a radial bearing including a first raceway, a second raceway and a plurality of rolling elements which are arranged between the first raceway and the second raceway. The test rig includes a section of the first raceway, a section of the second raceway and one or several of the plurality of rolling elements, wherein the section of the first raceway is arranged opposite to the section of the second raceway, the rolling elements are arranged between the section of the first raceway and the section of the second raceway, and the rolling elements are in contact with the sections of the first raceway and second raceway, and a means for applying load on the section of the first raceway and means for moving the section of the first raceway and the section of the second raceway relative to the one or several rolling elements.

20 Claims, 3 Drawing Sheets

(56) References Cited

U.S. PATENT DOCUMENTS

| | | | |
|---|---|---|---|
| 2005/0066741 A1* | 3/2005 | O'Brien | G01M 13/04 73/821 |
| 2007/0258672 A1 | 11/2007 | Tsujimoto et al. | |
| 2014/0298917 A1* | 10/2014 | Nivet | G01L 1/16 73/785 |
| 2016/0312823 A1 | 10/2016 | De Rooster et al. | |
| 2016/0369846 A1 | 12/2016 | Stocker et al. | |

FOREIGN PATENT DOCUMENTS

| | | |
|---|---|---|
| CN | 106065899 A | 11/2016 |
| DE | 10122797 A1 | 12/2002 |

OTHER PUBLICATIONS

Non-English Chinese Office Action for application No. 201710680684.8 dated Feb. 26, 2019.

\* cited by examiner

BEARING TEST RIG

CROSS-REFERENCE TO RELATED APPLICATIONS

This application claims priority to European application No. EP16183607.7, having a filing date of Aug. 10, 2016, the entire contents of which are hereby incorporated by reference.

FIELD OF TECHNOLOGY

The following relates to a test rig to test a radial bearing with rolling elements. In particular, embodiments of the invention relate to a concept for an improved fatigue test for such a bearing. Furthermore, embodiments of the invention relate to a method for testing a radial bearing with rolling elements.

BACKGROUND

The raceways and the rolling elements of a radial bearing are naturally exposed to wear and fatigue. Knowing the extent of wear and fatigue of a bearing is crucial when designing and maintaining such a bearing.

One approach to determine wear and fatigue of a radial bearing is to perform extensive laboratory tests in order to simulate the contact between the rolling elements and the raceways. These tests typically focus on the material characteristics and how they change over time during operation of the bearing, i.e. during loads acting on the bearing. Such laboratory tests are often times supplemented by computer simulations. A drawback of this approach is namely the large error sources which are related to these assessment methods. Furthermore, laboratory tests and computer simulation may take quite a long time until valid and trustworthy results are obtained.

Another approach to determine wear and fatigue of a radial bearing is full scale fatigue testing. For this purpose, a radial bearing in full scale, i.e. full size, is used and operated. Over time, the state of the raceways and the rolling elements are determined and, thus, statements regarding its wear and resulting maintenance efforts can be given. A drawback of these full scale bearing tests are the considerable costs and the long time span until reliable results are achieved.

Therefore, there exists the desire to provide a concept which is improved compared to the state of the art and which is able to test reliably a radial bearing.

SUMMARY

According to embodiments of the invention, there is provided a test rig to test a radial bearing, wherein the radial bearing comprises a first raceway, a second raceway and a plurality of rolling elements. These rolling elements are arranged between the first raceway and the second raceway. The test rig comprises a section of the first raceway, a section of the second raceway and one or several of the plurality of rolling elements. Note that the section of the first raceway is arranged opposite to the section of the second raceway. Additionally, the one or several rolling elements are arranged between the section of the first raceway and the section of the second raceway. Furthermore, the one or several rolling elements are in contact with the section of the first raceway and with the section of the second raceway. Finally, the test rig comprises means for applying load on the section of the first raceway and means for moving the sections of the first and second raceway relative to the one or several rolling elements.

Embodiments of the invention focus on radial bearings, contrary to linear bearings. A radial bearing is defined by raceways which have a substantially circular or annular shape, as viewed in a cross-sectional view. This is understood such that particularly the inner surface of the outer raceway has a substantially circular shape. Likewise, the outer surface of the inner raceway has a substantially circular shape.

The radial bearing to be tested comprises two raceways, a first raceway and a second raceway. This does not exclude that the radial bearing to be tested comprises even further raceways, e.g. a third and fourth raceway. The radial bearing to be tested may then, for instance, be a double bearing, in other words a double raceway bearing. This involves two raceways acting as inner raceways and two raceways acting as outer raceways.

Embodiments of the invention furthermore concentrate on radial bearings to be tested which comprise a plurality of rolling elements, contrary to e.g. sliding bearings. Examples of suitable and preferred rolling elements are described in more detail below.

In a certain embodiment of the invention, the raceway is a tapered bearing, i.e. a bearing with inclined raceways.

The test rig comprises a section of the first raceway and a section of the second raceway. In particular, the section of the first raceway is smaller than the entire first raceway. Likewise, in particular the section of the second raceway is smaller than the entire second raceway.

Note that the test rig comprises means for applying load on the section of the first raceway. Preferably, the first raceway is arranged such that—when load is applied on the first raceway—the force applying the load is pointing downwards. This has the advantage that the gravitational force which is causing the applied load on the section of the first raceway is acting in favor of this force.

Note that, particularly, as the one or several rolling elements are arranged between the section of the first raceway and the section of the second raceway, load is generally not only applied on the section of the first raceway, but also on the section of the second raceway and also on the rolling element(s). Consequently, both raceways—and even the rolling element(s)—are subjected to fatigue. Therefore, not only wear and fatigue of the first raceway can be analyzed, but also wear and fatigue of the second raceway and of the rolling element(s).

Such a test rig as described above can advantageously be used for a radial bearing of a wind turbine. Examples of radial bearings which are particularly useful for being tested with the inventive test rig are pitch bearings between the hub and the rotor blade of a wind turbine. Additionally, also the yaw bearing and the main bearing of a wind turbine are well suited to be tested with the described test rig.

A key aspect of embodiments of the present invention is that by only using sections of the first and second raceway, respectively, and by only using one (or a few) of the plurality of rolling elements, it is not necessary to provide a full scale bearing test rig in order to carry out reliable tests. Instead, only relatively small parts, which are sufficient for carrying out the tests, are extracted and arranged in a way that long term fatigue tests can be carried out.

In a first alternative, the means for moving the sections of the first and second raceway are arranged and configured such that both the section of the first raceway and the section of the second raceway can be moved parallel to each other.

In other words, both raceway sections are preferably moved simultaneously and in opposite direction. By application of a load on the system (comprising the two raceway sections and the one or several rolling elements), wherein the load is greater than the friction between the rolling element(s) and the raceway sections, the rolling element(s) remain substantially still, while the two raceway sections are moved parallel to each other. This has the advantage that the position of the rolling element(s) relative to the means for applying load, e.g. the hydraulic cylinder, remains unchanged. Therefore, an optimum position of the rolling element(s) with regard to the means for applying load can be chosen, which will then be kept throughout the test.

In a second alternative, one section of the raceway is kept still and only the other section of the raceway is moved.

Due to the load on the system, which is supposed to be greater than the friction between the rolling element(s) and the raceway sections, the rolling element(s) will still move relative to both raceway sections. Therefore, a reliable test is still possible.

This alternative has the advantage that only one raceway section needs to be moved, thus power consumption and wear of the means for moving the raceway section(s) is reduced.

In an embodiment of the invention, the first raceway comprises a substantially annular shape and the section of the first raceway is shorter than 25% of the perimeter of the first raceway. In particular, the section of the first raceway is shorter than 10% of the perimeter of the first raceway, even more particularly it is shorter than 5% of the perimeter of the first raceway.

Consequently, only a relatively small part of the first raceway (and a relatively small part of the second raceway) is needed for carrying out the test for the radial bearing. Note that this relatively small length of the raceway is typically sufficient such that the movement of the one or several rolling elements on this section of the first raceway can be carried out in a way that valid test results in order to reliably assess the radial bearing can be obtained.

Note that also only a relatively small section of the second raceway is needed for the proposed test rig. For practical purposes, it is advantageous to provide both sections, i.e. the section of the first raceway and the section of the second raceway, at substantially the same length.

A favorable consequence of the relatively small size of the section of the first raceway needed (and the relatively small size of the section of the first raceway needed) is that the mass of these sections of the first and second raceway, respectively, is relatively small. This could enable handling of the respective raceway sections by service personnel only, i.e. without any auxiliary means.

Another approach of characterizing the length of the section of the first raceway which is needed and used for the test rig is that its length is related to the perimeter of the rolling element of the radial bearing to be tested. In an embodiment of the invention, the section of the first raceway is shorter than twenty times of the perimeter of the rolling element, in particular shorter than five times of the perimeter of the rolling element, even more particularly shorter than two times of the perimeter of the rolling element.

Thus, it has been observed that even a relatively small length of the section of the raceway is sufficient in order to carry out valid fatigue tests of the radial bearing. The rolling length must ensure that the material is almost completely unloaded. The distance depends on the size of the rolling element, osculation ratio and load level, but it could be even less than the diameter of the rolling element. It may, however be preferred to choose a slightly larger length in order to, for instance, have a certain safety margin at one or both edges of the section of the first raceway.

In another embodiment of the invention, the test rig further comprises a retainer for detachable attaching a section of the first raceway to the test rig.

Providing such a retainer has the advantage that different sections of the first raceway can be tested easily. These different sections of the first raceway may be part of the same raceway; in other words, different sections of the same raceway are tested in the test rig. Furthermore, these different sections of the raceway may also originate from different raceways in order to test different bearings in the test rig. In any case, a retainer for quickly and easily changing the sections of the raceway to be tested is advantageous.

In another embodiment of the invention, the means for applying load to the section of the first raceway comprises a hydraulic cylinder.

Such a device is well proven and well suited in order to cyclically apply and relieve loads to and from the first raceway.

In another embodiment of the invention, the means for moving the raceway sections relative to the one or several rolling elements comprises a motor and rod system.

Such a motor and rod system is particularly suited to carry out predetermined movements of the rolling elements. For example, cyclical movements can be programmed and performed by the system.

In another embodiment of the invention, the contour of the inner surface of the section of the first raceway has the shape of a segment of a circle, wherein the segment of the circle is less than a semi-circle.

The inner surfaces of the raceways of a radial bearing typically are round and are able to receive and guide the rolling elements. In particular, typical raceways have inner surfaces with a shape which resemble a segment of a circle. Consequently, also the inner surface of the section of the first raceway being part of the test rig may have such a shape of a segment of a circle, namely less than a semi-circle. It has been proven that a quarter circle is also sufficient for carrying out reliable and valid test measurements.

In another embodiment of the invention, the back surface of the section of the first raceway comprises an edge and the section of the first raceway is arranged such that the edge of the back surface points downwards.

In other words, in an advantageous embodiment of the invention, the section of the first raceway is tilted, for instance about forty-five degrees, such that the corner edge points downwards. This has the advantage that the rolling elements can be guided and moved in an optimum manner.

Embodiments of the invention are further directed towards a method for testing a radial bearing, the radial bearing comprising a first raceway, a second raceway and a plurality of rolling elements which are arranged between the first raceway and the second raceway, wherein the method comprises the steps of providing a section of the first raceway, providing a section of the second raceway, providing one or several of the plurality of rolling elements, arranging the section of the first raceway opposite to the section of the second raceway and arranging the one or several rolling elements between the section of the first raceway and the section of the second raceway, wherein the one or several rolling elements are in contact with the section of the first raceway and with the section of the second raceway, applying load on the section of the first raceway, and moving the section (21) of the first raceway (11) and the section (22) of the second raceway (12) relative to the one or several rolling elements.

A key aspect of the inventive method is that after provision of a section of the first raceway and the second raceway and provision of one or several rolling elements of the radial bearing to be tested, these components are arranged in an appropriate manner and load is applied on the section of the first raceway and the raceway sections are moved relative to the one or several rolling elements. This movement may for example be a back and forth movement.

In a preferred embodiment of the inventive method, the movement is a cyclical movement. In other words, the movement is a periodical movement. This is the preferred movement in the fatigue test as by such a cyclical movement repeatable test conditions can be ensured. For instance, one application of the described method could be to carry out 1.000 movements back and forth of the raceway sections under a predetermined load and investigating the state and properties of the rolling element and the first raceway, i.e. the section thereof, in a laboratory.

In another embodiment, the contour of the inner surface of the section of the first raceway has the shape of a segment of a circle, and the method comprises the further step of transforming the section of the first raceway such that the segment of the circle is reduced to less than a semi circle.

In other words, this further step of changing or transforming the section of the first raceway includes taking away material and reducing the inner surface. This may be advantageous as less material and less weight of the section of the first raceway is present while reliable and valid test measurements can still be carried out. This is due to the fact that ideally only one contact line between the rolling element and the surface of the raceway to be tested may exist. Alternatively, also more than one contact line may exist but in any case, depending on the exact design of the raceway and the rolling element, it may not be necessary to have the full semi circle raceway surface being present.

In yet another embodiment of the invention, the first section of the raceway comprises a back surface and the method comprises the further step of flattening the back surface lengthwise.

This may include flattening the edge of the back surface pointing downwards. Note that the first raceway may have an annular shape. Therefore not only the inner surface may have a circular profile line but also the outer surface may have a circular profile line. Thus, when the section of the first raceway is taken out, then there may still be a curvature on the back surface. Therefore, flattening of the back surface lengthwise may be advantageous.

BRIEF DESCRIPTION

Some of the embodiments will be described in detail, with reference to the following figures, wherein like designations denote like members, wherein.

The illustration in the drawings is in schematic form. It is noted that in different figures, similar or identical elements may be provided with the same reference signs.

DETAILED DESCRIPTION

Figure 1:
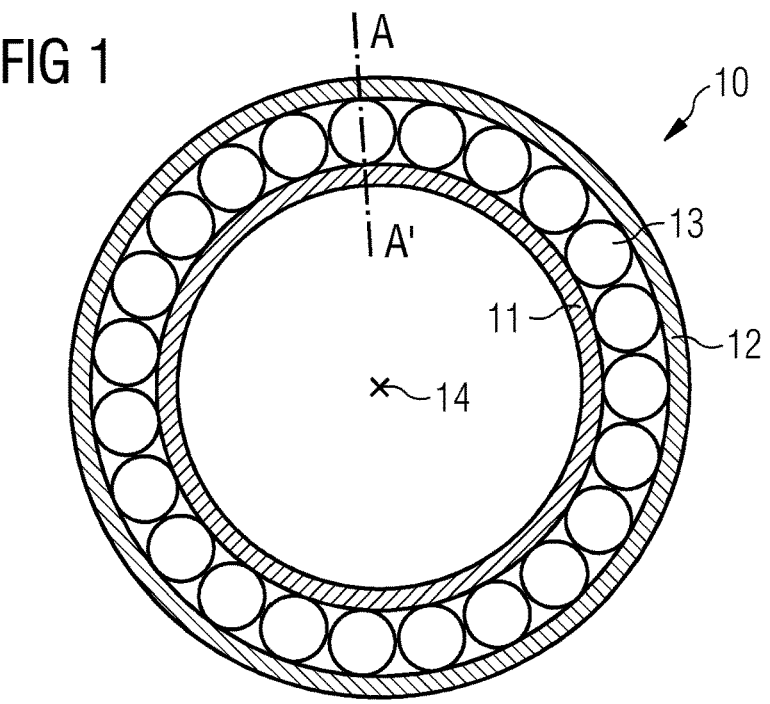
FIG. 1 shows a cross-sectional view of radial bearing, in accordance with embodiments of the present invention.

FIG. 1 shows a cross-sectional view of a radial bearing 10. The radial bearing 10 comprises a first raceway 11 and a second raceway 12. The first raceway 11 may also be denoted as inner raceway, while the second raceway 12 may be denoted as outer raceway. Both raceways 11, 12 have a substantially circular shape in a cross-sectional view.

The first raceway 11 and the second raceway 12 are arranged such to each other that the second raceway 12 can be rotated with regard to the first raceway 11 about a rotational axis 14.

The radial bearing 10 as shown in FIG. 1 is a rolling element radial bearing. This means that the two raceways 11, 12 do not directly slide against each other, but that a plurality of rolling elements 14 are arranged between the two raceways 11, 12. In the example as illustrated in FIG. 1, the rolling elements 14 are shaped as balls.

Figure 2:
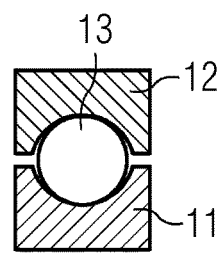
FIG. 2 shows a profile view along the line A-A' of this radial bearing, in accordance with embodiments of the present invention.

FIG. 2 shows a cross-sectional view along the line A-A' as illustrated in FIG. 1. It shows the profile of the first raceway 11 and the profile of the second raceway 12 along the rotational axis 14. It can be stated that the first raceway 11 has an inner surface which has the shape of a half circle. Likewise, the second raceway 12 also has an inner surface being shaped substantially as a half circle. For both raceways 11, 12 the back surfaces are substantially planar, respectively.

FIGS. 1 and 2 show a radial bearing which is to be tested by the inventive test rig.

Figure 3:
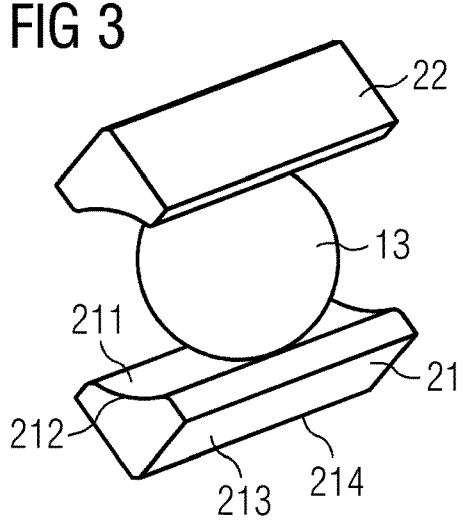
FIG. 3 shows parts of the test rig, in accordance with embodiments of the present invention.

FIG. 3 shows a section 21 of the first raceway 11 and a section 22 of the second raceway 12. Both sections 21, 22 are parts of the respective raceways 11, 12 of the radial bearing to be tested. FIG. 3 also shows a rolling element 13 which is a part also of the radial bearing to be tested. Note that the rolling element 13 is arranged between the section 21 of the first raceway 11 and the section 22 of the second raceway 12. Note that the rolling element 13 is in contact ideally at one single point with the section 21 of the first raceway 11 and with ideally one single point with the section 22 of the second raceway 12. Once that the rolling element 13 is being moved back and forth, corresponding contact lines are generated at the inner surfaces of the first and the second section 21, 22.

Note that the inner surface 211 of the section 21 of the first raceway 11 has a contour, in other words a contour line, 212, which shows a part of a circle segment. In particular, it has the shape of substantially a quarter circle. This is the case because the section 21 of the first raceway 11 which has been extracted from the first raceway 11 has been cut out. This has the advantage that material is saved and that the section 21 of the first raceway 11 can be transported manually more easily.

In FIG. 3, also the back surface 213 and its edge 214 is visible. The edge 214 of the back surface 213 is pointing downwards in FIG. 3. This is also the configuration how these components are assembled in the test rig, as can be seen in FIG. 4.

Figure 4:
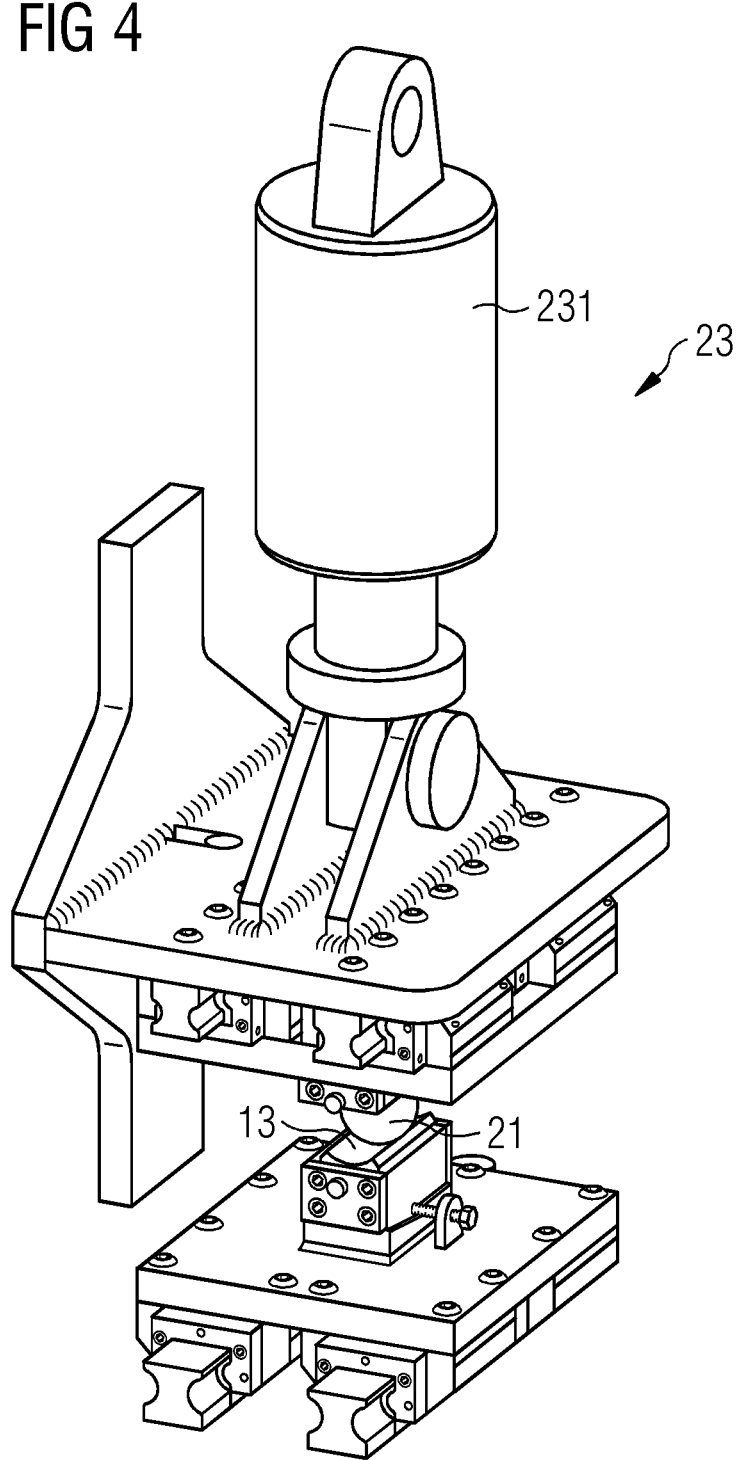
FIG. 4 shows an overview on the test rig focusing on the hydraulic cylinder applying load of the section of the first raceway, in accordance with embodiments of the present invention.

FIG. 4 shows the means 23 for applying load. Load is applied on the section 22 of the second raceway 12 and thus indirectly also on the rolling element 13 and the section 21 of the first raceway 11. Exemplarily, the means for applying load could be realized as an hydraulic cylinder 231. An hydraulic cylinder is advantageous as it allows application of a specific and repeatable loading of the rolling element 13 and the section 21 of the first raceway 11.

Figure 5:
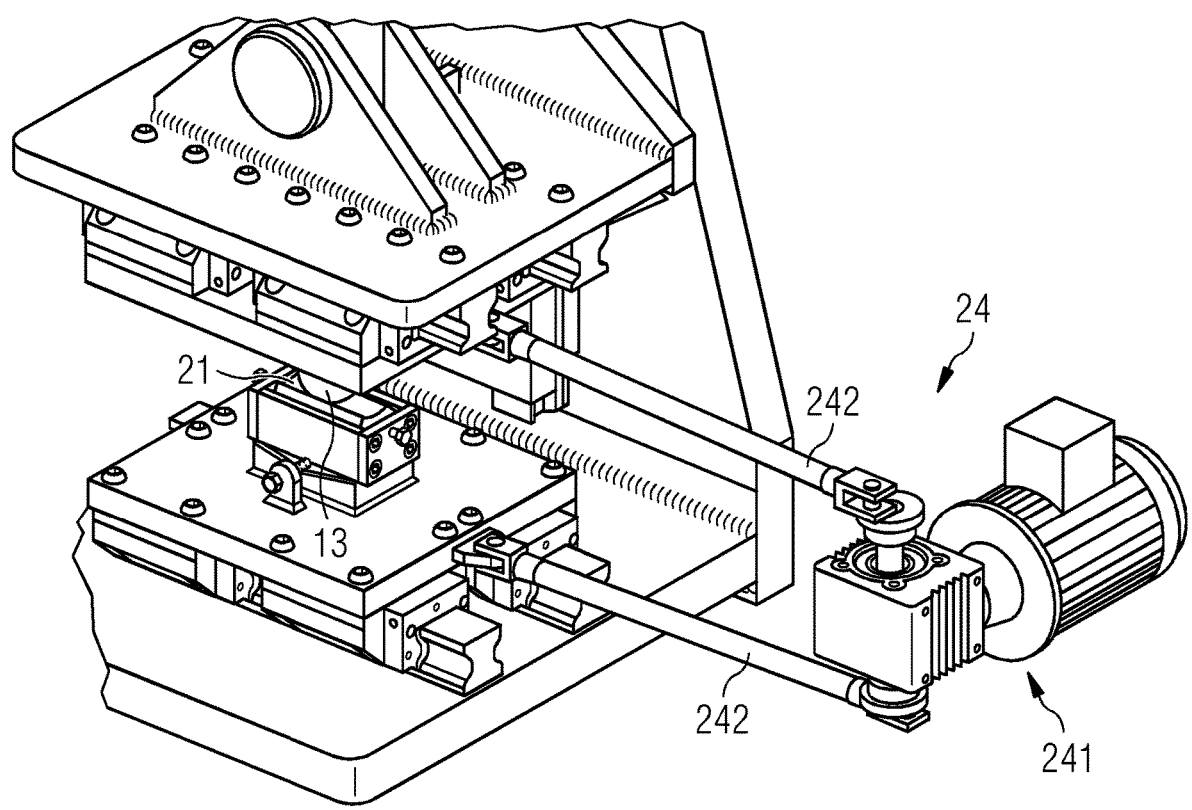
FIG. 5 shows the motor and rod system to move the rolling element on the section of the first raceway, in accordance with embodiments of the present invention.

Another key component of the test rig is the motor and rod system which is shown in FIG. 5. FIG. 5 discloses the means for moving the section 21 of the first raceway 11 and the section 22 of the second raceway 12. This means is concretely realized by two rods 242 which connect the support table carrying the section 21 of the first raceway 11 and the section 22 of the second raceway 12. Therefore, these two support tables can be moved back and forth. This movement is realized by a motor 241. In particular, a cyclical movement is realized. By this measure a reliable and repeatable long time measurement for testing the characteristics of the radial bearing 10 can be ensured.

The claims are as follows:

1. A test rig to test a radial bearing, the radial bearing including a first raceway, a second raceway and a plurality of rolling elements which are arranged between the first raceway and the second raceway, the test rig comprising:
    a section of the first raceway;
    a section of the second raceway;
    at least one rolling element of the plurality of rolling elements, the section of the first raceway is arranged opposite to the section of the second raceway, wherein the at least one rolling element is arranged between the section of the first raceway and the section of the second raceway, and the at least one rolling element is in contact with the section of the first raceway and with the section of the second raceway,
    a means for applying a load on the section of the first raceway; and
    a means for moving the section of the first raceway and the section of the second raceway relative to the at least one rolling element, wherein the means for moving the section of the first raceway and the section of the second raceway is configured such that the section of the first raceway and the section of the second raceway can be moved substantially parallel to each other.

2. The test rig according to claim 1, wherein the first raceway comprises a substantially annular shape and the section of the first raceway is shorter than 25% of a perimeter of the first raceway.

3. The test rig according to claim 1, wherein the at least one rolling element comprises a substantially circular cross section defining a perimeter of the at least one rolling element, and the section of the first raceway is shorter than twenty times of the perimeter of the at least one rolling element.

4. The test rig according to claim 3, wherein the section of the first raceway is longer than the perimeter of the at least one rolling element.

5. The test rig according to claim 1, further comprising a retainer for detachably attaching the section of the first raceway to the test rig.

6. The test rig according to claim 1, wherein the means for applying the load to the section of the first raceway comprises a hydraulic cylinder.

7. The test rig according to claim 1, wherein the means for moving the section of the first raceway and the section of the second raceway, respectively, relative to the at least one rolling element comprises a motor and rod system.

8. The test rig according to claim 1, wherein a contour of an inner surface of the section of the first raceway has a shape of a segment of a circle, wherein the segment of the circle is less than a semi-circle.

9. The test rig according to claim 1, wherein a back surface of the section of the first raceway comprises an edge and the section of the first raceway is arranged such that the edge of the back surface points downwards.

10. The test rig according to claim 1, wherein the section of the first raceway is shorter than 10% of a perimeter of the first raceway.

11. The test rig according to claim 1, wherein the section of the first raceway is shorter than 5% of a perimeter of the first raceway.

12. The test rig according to claim 1, wherein the section of the first raceway is shorter than five times of a perimeter of the at least one rolling element.

13. The test rig according to claim 1, wherein the section of the first raceway is shorter than two times of a perimeter of the at least one rolling element.

14. A method for testing a radial bearing, the radial bearing including a first raceway, a second raceway and a plurality of rolling elements which are arranged between the first raceway and the second raceway, wherein the method comprises:
    providing a section of the first raceway;
    providing a section of the second raceway;
    providing at least one rolling element of the plurality of rolling elements; arranging the section of the first raceway opposite to the section of the second raceway and arranging the at least one rolling element between the section of the first raceway and the section of the second raceway, wherein the at least one rolling element is in contact with the section of the first raceway and with the section of the second raceway;
    applying a load on the section of the first raceway; and
    moving the section of the first raceway and the section of the second raceway relative to the at least one rolling element, the moving comprising at least one of:
        a cyclical movement by the section of the first raceway and the section of the second raceway, and
        substantially parallel movement between the section of the first raceway and the section of the second raceway.

15. The method according to claim 14, wherein a contour of an inner surface of the section of the first raceway has a shape of a segment of a circle, and the method comprises the further step of transforming the section of the first raceway such that the segment of the circle is reduced to less than a semi-circle.

16. The method according to claim 14, wherein the section of the first raceway comprises a back surface, and the method comprises the further step of flattening the back surface lengthwise.

17. A test rig, the test rig comprising:
    a section of a first raceway of a radial bearing, wherein an extent of the section of the first raceway is equal to less than the entirety of an extent of the first raceway;
    a section of a second raceway of the radial bearing, wherein an extent of the section of the second raceway is equal to less than the entirety of an extent of the second raceway;

at least one rolling element of the radial bearing, wherein the at least one rolling element is equal to fewer than all of the rolling elements of the radial bearing, wherein the section of the first raceway is arranged opposite to the section of the second raceway, wherein the at least one rolling element is arranged between the section of the first raceway and the section of the second raceway, and the at least one rolling element is in contact with the section of the first raceway and with the section of the second raceway, a means for applying a load on the section of the first raceway; and a means for moving the section of the first raceway and the section of the second raceway relative to the at least one rolling element, wherein the means for moving the section of the first raceway and the section of the second raceway is configured such that movement of the section of the first raceway and the section of the second raceway is at least one of substantially cyclical and substantially parallel.

18. The test rig according to claim 17, wherein the first raceway comprises a substantially annular shape and the section of the first raceway is shorter than 25% of a perimeter of the substantially annular shape of the first raceway.

19. The test rig according to claim 17, wherein the at least one rolling element comprises a substantially circular cross section defining a perimeter of the at least one rolling element, and the section of the first raceway is shorter than twenty times of the perimeter of the at least one rolling element.

20. The test rig according to claim 17, further comprising a retainer for detachably attaching at least one of the section of the first raceway and the section of the second raceway to the test rig.

* * * * *